(12) United States Patent
Ishigami

(10) Patent No.: US 8,437,096 B2
(45) Date of Patent: May 7, 2013

(54) OPTICAL DEVICE AND OPTICAL INSTRUMENT

(75) Inventor: Hiroyuki Ishigami, Yokohama (JP)

(73) Assignee: Nikon Corporation, Tokyo (JP)

( * ) Notice: Subject to any disclaimer, the term of this patent is extended or adjusted under 35 U.S.C. 154(b) by 164 days.

(21) Appl. No.: 12/903,405

(22) Filed: Oct. 13, 2010

(65) Prior Publication Data

US 2011/0188135 A1 Aug. 4, 2011

(30) Foreign Application Priority Data

Jan. 29, 2010 (JP) .................................. 2010-019068

(51) Int. Cl.
G02B 7/02 (2006.01)

(52) U.S. Cl.
USPC ........... 359/823; 359/819; 359/813; 359/694; 396/79; 396/133

(58) Field of Classification Search .................. 359/811, 359/813, 819, 822, 823, 873; 396/72–75; 348/360

See application file for complete search history.

(56) References Cited

U.S. PATENT DOCUMENTS

| | | | | |
|---|---|---|---|---|
| 3,334,959 A * | 8/1967 | Walsh | ........................... | 359/873 |
| 4,488,787 A * | 12/1984 | Osawa | ........................... | 359/702 |
| 5,424,793 A * | 6/1995 | Fukushima et al. | ............ | 396/83 |
| 6,262,853 B1 * | 7/2001 | Takanashi et al. | ............. | 359/703 |
| 6,317,278 B1 * | 11/2001 | Metsala | ......................... | 359/813 |
| 6,805,665 B1 * | 10/2004 | Tatsuno et al. | ................ | 600/112 |
| 6,909,558 B2 * | 6/2005 | Orimo et al. | ................... | 359/694 |
| 6,972,910 B2 * | 12/2005 | Orimo et al. | ................... | 359/694 |
| 2011/0013296 A1 * | 1/2011 | Kazahaya | ...................... | 359/819 |

FOREIGN PATENT DOCUMENTS

| | | |
|---|---|---|
| JP | U-4-126213 | 11/1992 |
| JP | A-2002-267912 | 9/2002 |
| JP | A-2003-98461 | 4/2003 |
| JP | A-2004-109710 | 4/2004 |
| JP | A-2006-58582 | 3/2006 |
| JP | A-2006-337470 | 12/2006 |
| JP | A-2007-212497 | 8/2007 |
| JP | A-2007-310067 | 11/2007 |
| JP | A-2010-2856 | 1/2010 |
| JP | A-2010-169938 | 8/2010 |

OTHER PUBLICATIONS

Jan. 10, 2012 Office Action issued in Japanese Patent Application No. 2010-019068 (with translation).
Aug. 14, 2012 Notice of Reasons for Rejection issued in Japanese Application No. 2010-019068.

* cited by examiner

Primary Examiner — Loha Ben
(74) Attorney, Agent, or Firm — Oliff & Berridge, PLC

(57) ABSTRACT

An optical device comprises: a first holding frame holding an optical system; a second holding frame holding the first holding frame and having a groove provided on a face opposing the first holding frame; an elastic member provided between the first holding frame and the second holding frame; a position determining portion capable of determining a position of the first holding frame towards the elastic member, and provided to sandwich, with the elastic member, the first holding frame; a fixing portion is capable of fixing the first holding frame towards the position determining portion so that the first holding frame is fixed, and which is provided to sandwich, with the position determining portion, the first holding frame; and a protruding portion which has a first end fixed to the first holding frame, and another end which differs from the first end and which is inserted into the groove.

9 Claims, 10 Drawing Sheets

OPTICAL DEVICE AND OPTICAL INSTRUMENT

The present application claims priority under 35 U.S.C. §119 to Japanese Patent Application No. 2010-019068 filed on Jan. 29, 2010. The content of the application incorporated herein by reference in its entirety.

BACKGROUND OF THE INVENTION

1. Field of the Invention

The present invention relates to an optical device and an optical instrument.

2. Description of the Related Art

A technique for adjusting the position of an optical system provided in an optical device is disclosed in Japanese Unexamined Patent Publication No. 2006-58582.

SUMMARY OF THE INVENTION

The problem to be solved by the present invention is to provide an optical device and optical instrument which can provide favorable optical characteristics.

The present invention solves the above problem by the following means. Further, in order to facilitate understanding, reference numerals are appended corresponding to the drawings showing one embodiment, however, these do not limit the present invention.

An optical device of the first aspect comprises: a first holding frame which holds an optical system; a second holding frame which holds the first holding frame and which has a groove provided on a face opposing the first holding frame; an elastic member which has elasticity and which is provided between the first holding frame and the second holding frame when seen from a direction crossing an optical axis of the optical system; a position determining portion which is capable of determining a position of the first holding frame towards the elastic member so as to give rise to an elastic force at the elastic member, and which is provided so as to sandwich, with the elastic member, the first holding frame when seen from a direction crossing the optical axis; a fixing portion which is capable of fixing the first holding frame towards the position determining portion so that the first holding frame is fixed, and which is provided so as to sandwich, with the position determining portion, the first holding frame when seen from a direction crossing the optical axis; and a protruding portion which has a first end fixed to the first holding frame, and another end which differs from the first end and which is inserted into the groove.

In the above construction, the groove may be provided extending in a planar direction orthogonal to the optical axis.

In the above construction, a clearance between the groove and the protruding portion in the optical axis direction may be narrower than the clearance between the groove and the protruding portion in a planar direction orthogonal to the optical axis.

In the above construction, the groove may be a penetrating groove formed on the second holding frame.

In the above construction, three or more protruding portions may be provided along a planar direction orthogonal to the optical axis.

In the above construction, the position determining portion and the fixing portion may be a screw which capable of advancing and withdrawing in a direction orthogonal to the optical axis; and the protruding portion is provided along a direction orthogonal to the optical axis.

In the above construction, the protruding portion may be capable of sliding along the inner peripheral face of the groove.

An optical device of the second aspect, comprises: a first holding frame which holds an optical system and which has a groove provided at its outer peripheral face; a second holding frame which holds the first holding frame; an elastic member which has elasticity and which is provided between the first holding frame and the second holding frame when seen from a direction crossing an optical axis of the optical system; a position determining portion which is capable of determining a position of the first holding frame towards the elastic member so as to give rise to an elastic force at the elastic member, and which is provided so as to sandwich, with the elastic member, the first holding frame when seen from a direction crossing the optical axis; a fixing portion which is capable of fixing the first holding frame towards the position determining means so that the first holding frame is fixed, and which is provided so as to sandwich, with the position determining portion, the first holding frame when seen from the direction crossing the optical axis, and a protruding portion having a first end fixed to the second holding frame, and another end which differs from the first end and which is inserted into the groove.

An optical instrument comprising the optical device descried above.

According to the present invention, it is possible to provide an optical device and optical instrument having favorable optical characteristics.

DETAILED DESCRIPTION OF THE PREFERRED EMBODIMENT

Below, the present invention is explained through embodiments of the invention, but the following embodiments do not limit the claimed invention. Further, all of the combinations of the features explained in the embodiments are not limited to the means for solving the problems.

Figure 1:
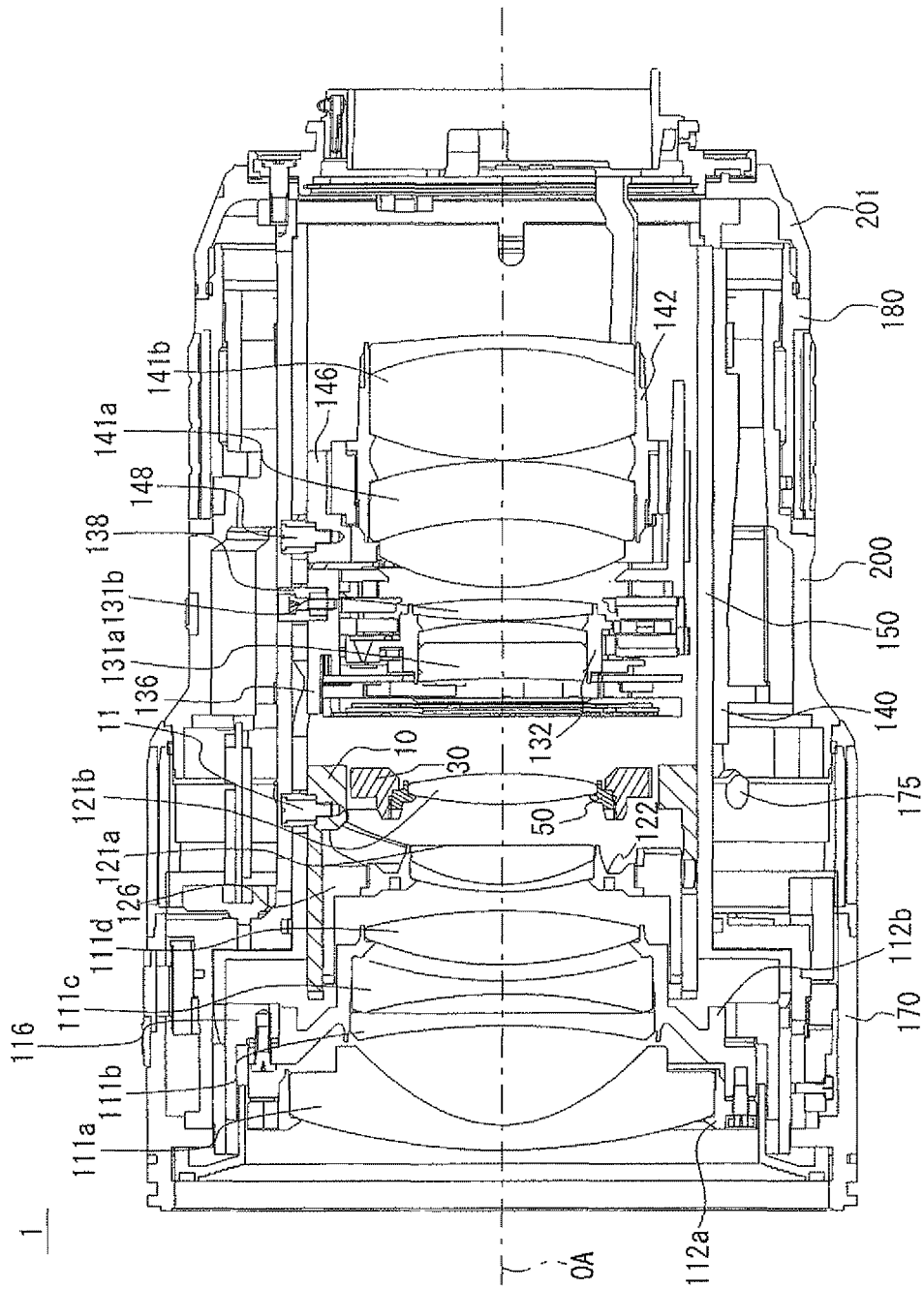
FIG. 1 is a drawing showing the internal constitution of a lens barrel.

FIG. 1 shows the internal constitution of a lens barrel 1. The lens barrel 1 is one example of an optical device. In FIG. 1, the coupling members 10 and 30, and holding frame 50, explained in detail later, are shown with hatching. As shown in FIG. 1, the lens barrel 1 is provided with first to fourth lens units. The lenses 111*a* to 111*d* correspond to the first lens unit, the lenses 121*a* and 121*b* correspond to the second lens unit, the lenses 131*a* and 131*b* correspond to the third lens unit, and the lenses 141*a* and 141*b* correspond to the fourth lens unit. The lens 111a is held by the holding frame 112a, the lenses 111b to 111d are held by the holding frame 112b. The lens 121a is held by the holding frame 122. The lens 121b is held by the holding frame 50. The lenses 131a and 131b are held by the holding frame 132, and the lenses 141a and 141b are held by the holding frame 142.

The lens barrel 1 is provided with the fixed tube 140 which is fixed to an optical instrument such as a camera body, and the cam tube 150 which is accommodated in the fixed tube 140. The fixed tube 140 and the cam tube 150 are both cylinders having the optical axis OA as their axial directions, and the cam tube 150 mates to be freely rotatable about the optical axis OA with the inner peripheral face of the fixed tube 140. The first to fourth lens units and the holding frames 112a, 112b, 132, and 142 are disposed at the inner peripheral side of the cam tube 150.

The coupling member 30 and holding frame 50 are engaged by mating. The holding frames 112b, 122, coupling member 30, and holding frame 132 and 142 are respectively fitted with the cylindrical coupling members 116, 126, 10, 136, and 146 and mated to be freely rotatable about the optical axis, at the inner peripheral face of the cam tube 150. Further, the coupling member 126 is engaged with the inner peripheral side of the coupling member 10. The holding frame 112a is engaged with the holding frame 112b.

Here, the outer peripheral faces of the coupling members 10, 136, and 146 which contact the inner peripheral face of the cam tube 150 are respectively engaged with the cam pins 11, 138, and 148. Further, a cam pin, not shown in the drawings, is engaged with the coupling member 116. On the other hand, at the cam tube 150, a plurality of cam grooves are formed into which the cam pin 11 and the like are respectively inserted. Further, the cam grooves are omitted from the drawings. By the rotation of the cam tube 150 about the optical axis OA, the cam pin 11 and the like are pushed in the optical axis OA direction by the cam grooves, and the coupling members 10, 136, 146 are moved in the direction of the optical axis OA.

Further, at the outer peripheral side of the second lens unit, the focus ring 170 is disposed. This focus ring 170 is fitted with the fixed tube 140 and the first outer fixed tube 200 so as to be freely rotatable about the optical axis. Further, at the outer peripheral side of the fourth lens unit, the zoom ring 180 is disposed. This zoom ring 180 is fitted with the first outer fixed tube 200 and the second outer fixed tube 201 so as to be freely rotatable about the optical axis.

Here, one lens 121b of the second lens unit is an aligning lens for which the position of the optical axis OA is adjustable. A detailed explanation is given later, but the outer peripheral face of the coupling member 30 which holds the lens 121b as an aligning lens makes contact with a plurality of adjustment screws 20a and 20b which are capable of advancing or retreating in a direction orthogonal to the optical axis OA (below referred to as the radial direction RD), and also a fixing screw 20c which is capable of advancing or retreating in the radial direction RD of the lens 121b.

At the focus ring 170, a through hole 175 is formed. Further, at the fixing tube 140, a through hole, not shown in the drawings, is formed at a position corresponding to the through hole 175. These through holes are for inserting a tool for adjusting the adjustment screws 20a and 20b and the fixing screw 20c. A tool is inserted into these through holes, and it is possible to adjust the thread-engaging amount of the adjustment screws 20a and 20b, and the fixing screw 20c. The tool is, for example, a wrench. At the adjustment screws 20a and 20b and the fixing screw 20c, respective wrench holes 21a to 21c are formed.

Figure 2:
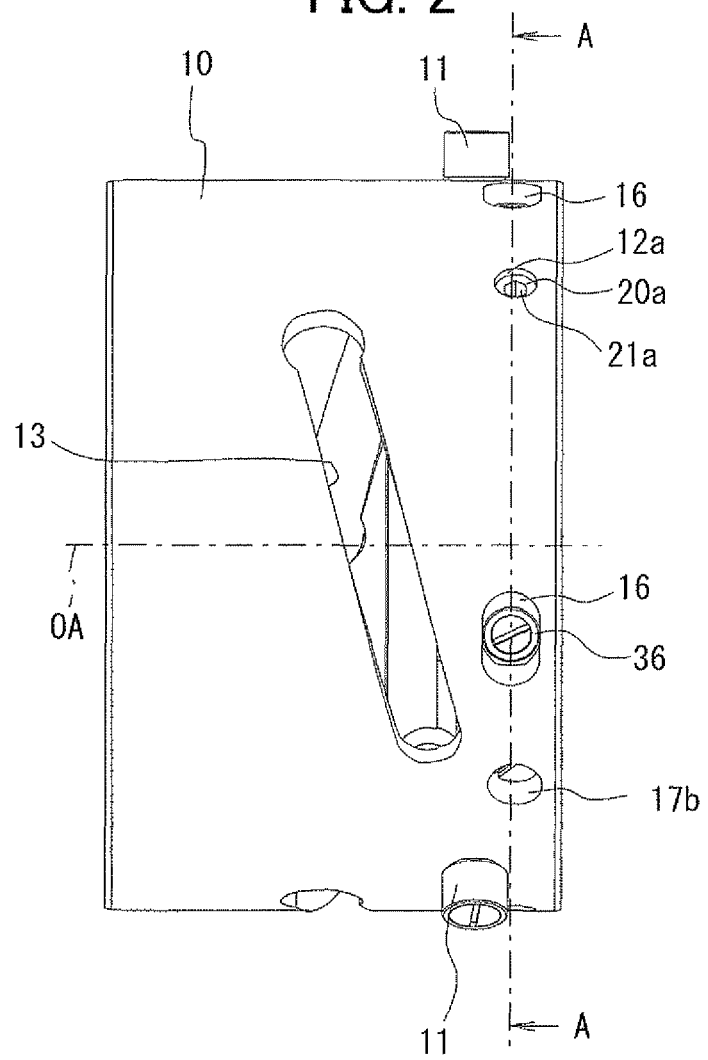
FIG. 2 is a side view drawing of a coupling member.
Figure 3:
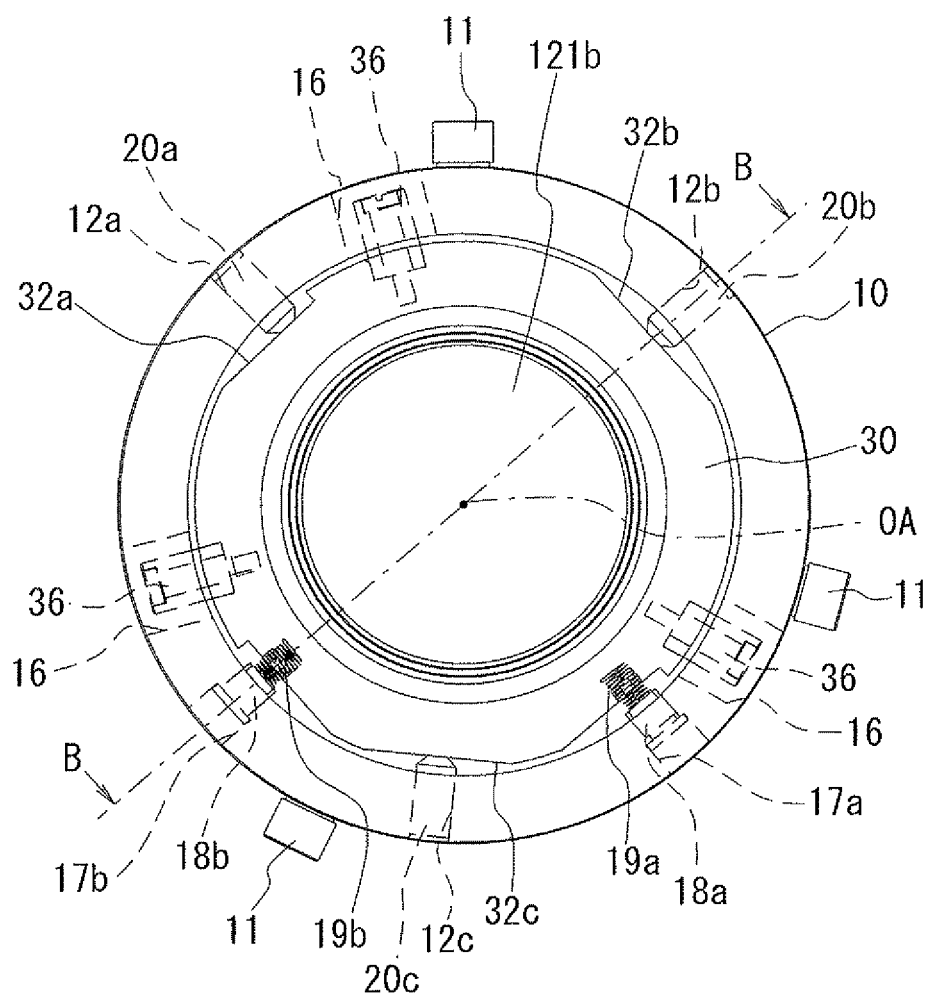
FIG. 3 is a front view drawing of a coupling member.
Figure 4:
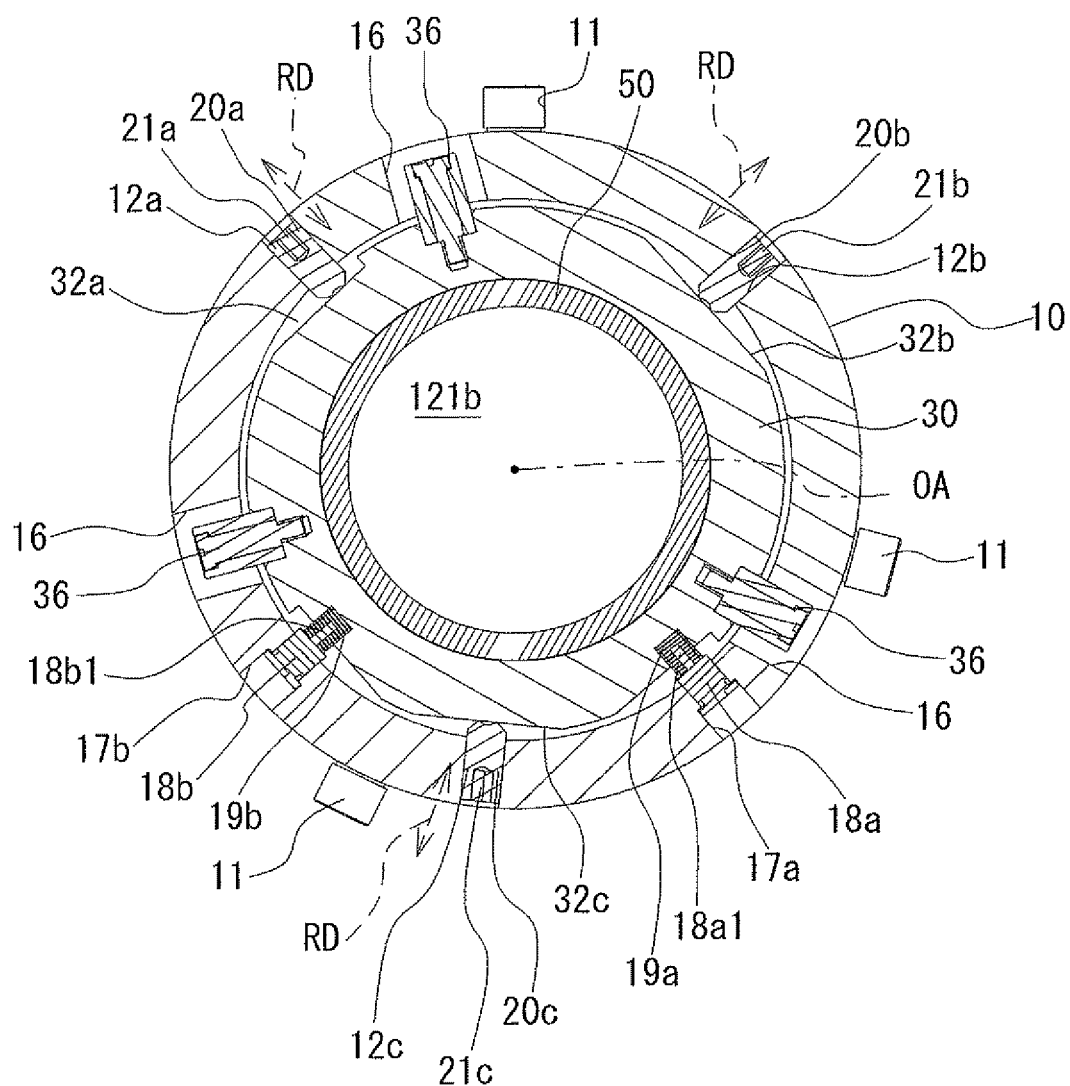
FIG. 4 is a cross sectional drawing along A-A of FIG. 2.
Figure 5:
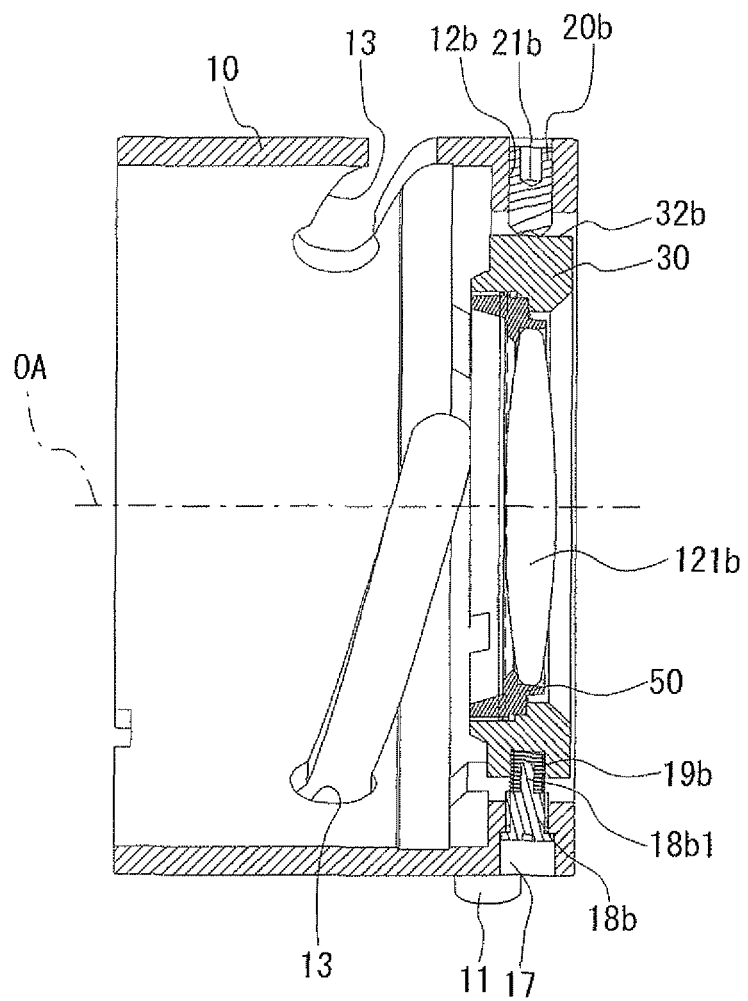
FIG. 5 is a cross sectional drawing along B-B of FIG. 3.

FIG. 2 is a side view drawing of the coupling members 10 and 30. FIG. 3 is a front view drawing of the coupling members 10 and 30. FIG. 4 is a cross section drawing along A-A of FIG. 2, and FIG. 5 is a cross section drawing along B-B of FIG. 3. At the outer peripheral face of the coupling member 10, three cam pins 11 are formed.

At the coupling member 10, two holes 17a and 17b are formed. The holes 17a and 17b are respectively covered by the covers 18a and 18b. The springs 19a and 19b are provided between the coupling member 10 and the coupling member 30 when viewed from a direction which crosses the optical axis OA. In more detail, the spring 19a is provided between the cover 18a and the coupling member 30, and the spring 19b is provided between the cover 18b and the coupling member 30. The springs 19a and 19b are each coil springs. The springs 19a and 19b, as shown in FIG. 4, are fitted with the indented portion formed at the outer peripheral face of the coupling member 30. The covers 18a and 18b respectively have formed thereon the protruding portions 18a1 and 18b1 which are inserted into the springs 19a and 19b. The protruding portions 18a1 and 18b1 project to the inner side of the radial direction RD. In this way, the springs 19a and 19b are prevented from being separated from the respective covers 18a and 18b.

In the above described coupling member 10, the adjustment screws 20a and 20b, and the fixing screw 20c are thread-engaged. As shown in FIG. 3 and FIG. 4, the adjustment screws 20a and 20b, and the fixing screw 20c are respectively thread-engaged with the screw holes 12a to 12c formed in the coupling member 10. The adjustment screws 20a and 20b and the fixing screw 20c protrude to the inner side of the coupling member 10. By respectively adjusting the thread-engagement amounts of the adjustment screws 20a and 20b and the fixing screw 20c with the screw holes 12a to 12c, the protrusion amount from the coupling member 10 can be adjusted. Accordingly, the adjustment screws 20a and 20b and the fixing screw 20c, as shown in FIG. 4, are capable of being advanced and withdrawn along the radial direction RD of the lens 121b.

The adjustment screws 20a and 20b and the fixing screw 20c are respectively contacted with the pressure receiving faces 32a to 32c formed at the outer peripheral face of the coupling member 30. As shown in FIG. 3, the pressure receiving faces 32a to 32c are flat when seen from the direction of the optical axis OA. The adjustment screws 20a and 20b and the fixing screw 20c, as shown in FIG. 3 and FIG. 4, are disposed to have approximately the same angular intervals about the optical axis OA, but are not limited being disposed in this way.

The adjustment screw 20a is provided so as to sandwich, with the spring 19a, the coupling member 30 when viewed in a direction crossing the optical axis OA. In the same way, the adjustment screw 20b is provided so as to sandwich, with the spring 19b, the coupling member 30 when viewed from a direction crossing the optical axis OA. In other words, the adjustment screw 20a and the cover 18a are disposed at opposite sides sandwiching the optical axis OA, and the adjustment screw 20b and cover 18b are also disposed in the same way. By making the adjustment screws 20a and 20b advance and withdraw in the radial direction RD, it is possible to determine the position of the coupling member 30 towards the springs 19a and 19b so as to generate an elastic force in the springs 19a and 19b.

Further, the adjustment screws 20a and 20b are not limited to respectively opposing the springs 19a and 19b so as to sandwich the coupling member 30. It is sufficient for the adjustment screws 20a and 20b to respectively be capable of determining the position of the coupling member 30 towards the springs 19a and 19b such that an elastic force arises at the respective springs 19a and 19b. In this case, the adjustment screws 20a and 20b may be provided at an arbitrary position of the coupling member 10.

The fixing screw 20c, as shown in FIG. 4, is disposed so as to sandwich, with the adjustment screws 20a and 20b, the coupling member 30 when viewed from a direction crossing the optical axis OA. By making the fixing screw 20c advance and withdraw in the radial direction RD, the fixing screw is capable of fixing the coupling member 30 towards the adjustment screws 20a and 20b.

Further, the fixing screw 20c is not limited to being opposed to the respective adjustment screws 20a and 20b so as to sandwich the coupling member 30. It is sufficient for the fixing screw 20c to be capable of determining the position of the coupling member 30 towards the adjustment screws 20a and 20b so that the coupling member 30 is fixed. In this case, the fixing screw 20c may be provided at an arbitrary position of the coupling member 10.

The spring 19a energizes the coupling member 30 so that the coupling member 30 is pushed towards the adjustment screw 20a. In the same way, the spring 19b energizes the coupling member 30 so that the coupling member 30 is pushed towards the adjustment screw 20b. Further, the rigidity of the adjustment springs 20a and 20b is higher than that of the springs 19a and 19b.

In this way, the position of the coupling member 30 in the radial direction of the lens 121b is determined, thus by advancing and withdrawing the adjustment screws 20a and 20b in the radial direction, the position of the coupling member 30 in the radial direction of the lens 121b can be adjusted, and the position of the optical axis OA of the lens 121b is adjustable in the radial direction.

At the coupling member 10, three grooves 16 are formed. The grooves 16 are formed in a planar direction orthogonal to the optical axis OA. In other words, the grooves 16 extend along the outer peripheral direction of the coupling member 10. The grooves 16 pass through the coupling member 10, but it is not necessary for them to pass through. The grooves 16 are formed to have an approximately equal angular interval about the optical axis OA.

At the outer peripheral face side of the coupling member 30, the three pins 36 are engaged. It is also possible to provide more than three pins 36. The pins 36 protrude along the planar direction orthogonal to the optical axis OA. In other words, the pins 36 protrude at the outer side of the radial direction RD of the coupling member 30. The pins 36 are disposed at approximately equal angular intervals about the optical axis OA. The plurality of pins 36 are respectively inserted into the plurality of grooves 16. Accordingly, at the coupling member 10 and coupling member 30, three sets of pins 36 and grooves 16 are provided. One end side of the pins 36 is fixed to the coupling member 30 side, and the other end side is inserted into the groove 16. The pin 36 is capable of sliding in the groove 16.

In this way, by inserting the pins 36 fixed to the coupling member 30 into the grooves 16 of the coupling member 10, the coupling member 30 is allowed to move only in the direction of the grooves 16 with respect to the coupling member 10. In this way, it is possible to restrict the direction of the movement of the coupling member 30 with respect to the coupling member 10.

As shown in FIG. 2 and FIG. 4, the grooves 16 run along a planar direction orthogonal to the optical axis OA. In this way, the coupling member 30 is allowed to move only within a plane orthogonal to the optical axis OA. For example, when adjusting the position of the coupling member 30 by the adjustment screws 20a and the fixing screw 20b and the like, it is necessary to turn the adjustment screw 20a or the like. The adjustment screw 20a or the like, as shown in FIG. 3, contacts the coupling member 30. Because of this, when turning the adjustment screw 20a or the like, the turning force of the adjustment screw 20a is transmitted to the coupling member 30, and there is the concern that the coupling member 30 will, for example, slant with respect to the optical axis OA. If the coupling member 30 slants with respect to the optical axis OA, the optical axis of the lens 121b held in the coupling member 30 will slant, and there is the concern that the optical characteristics will be degraded in this way.

However, in the lens barrel 1 of the present embodiment, the coupling member 30 is allowed to move only within a plane orthogonal to the optical axis OA. In this way, the coupling member 30 is prevented from slanting with respect to the optical axis OA, and it is possible to obtain favorable optical characteristics. Further, slanting of the coupling member 30 with respect to the optical axis OA means that, with respect to the axis of the coupling member 10, the axis of the coupling member 30 or the optical axis of the lens 121b held by the coupling member 30 is slanted.

Figure 6:
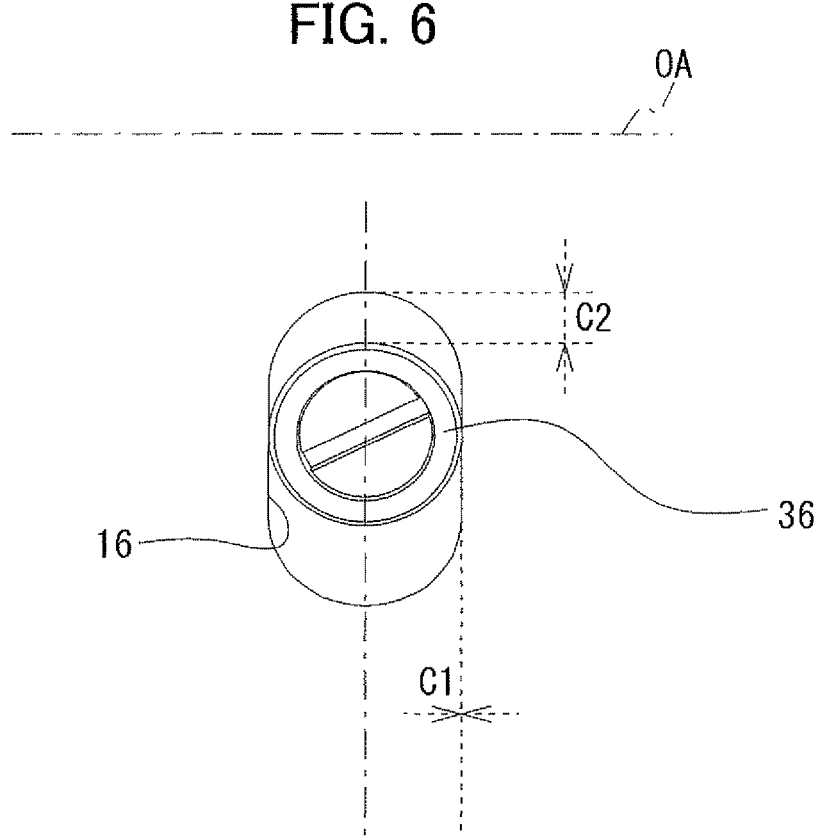
FIG. 6 is a partial enlarged drawing of the vicinity of the groove shown in FIG. 2.

FIG. 6 is a partial enlarged drawing of the vicinity of the groove 16 shown in FIG. 2. As shown in FIG. 6, the space C1 between the groove 16 and the pin 36 in the direction of the optical axis OA is smaller than the space C2 between the groove 16 and the pin 36 in the planar direction orthogonal to the optical axis OA. Accordingly, the pin 36 is allowed to move in a planar direction orthogonal to the optical axis OA in the groove 16. In this way, by the pin 36 and the groove 16, it is possible to guide the movement of the coupling member 30 in a direction in which it is pushed by the adjustment screws 20a and 20b, while preventing slanting of the optical axis OA of the lens 121b. In this way, the positional precision of the optical axis of the lens 121b can be improved.

Figure 7:
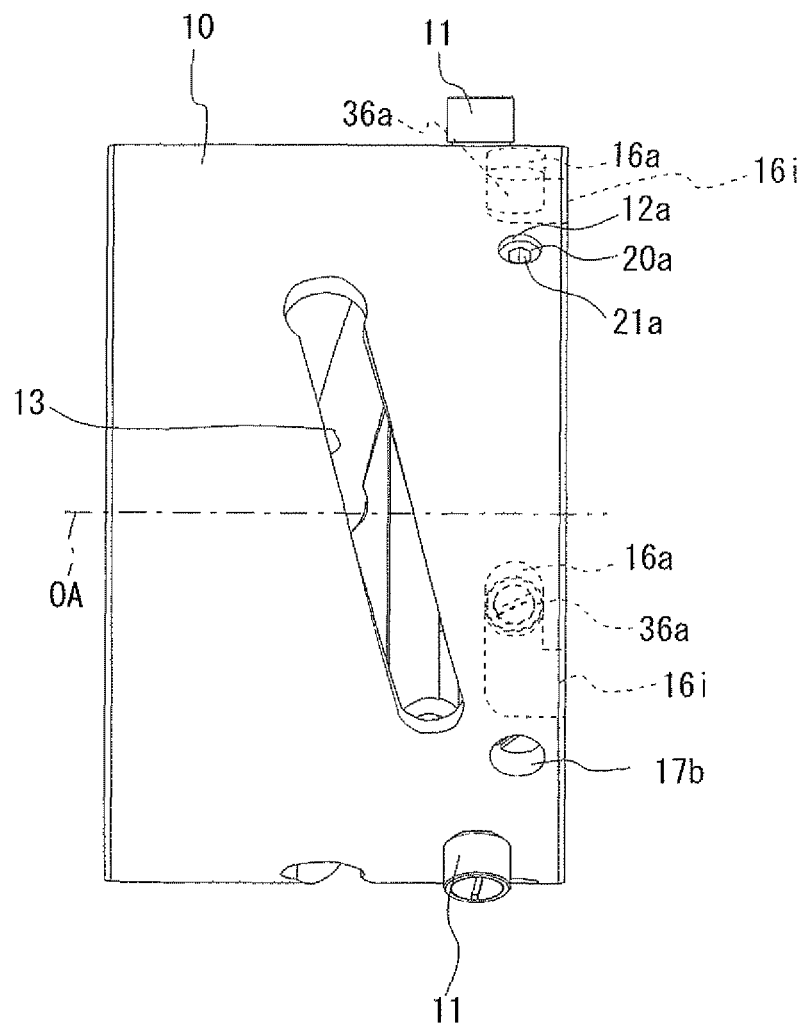
FIG. 7 is a drawing for explaining the coupling member according to the first embodiment.
Figure 8:
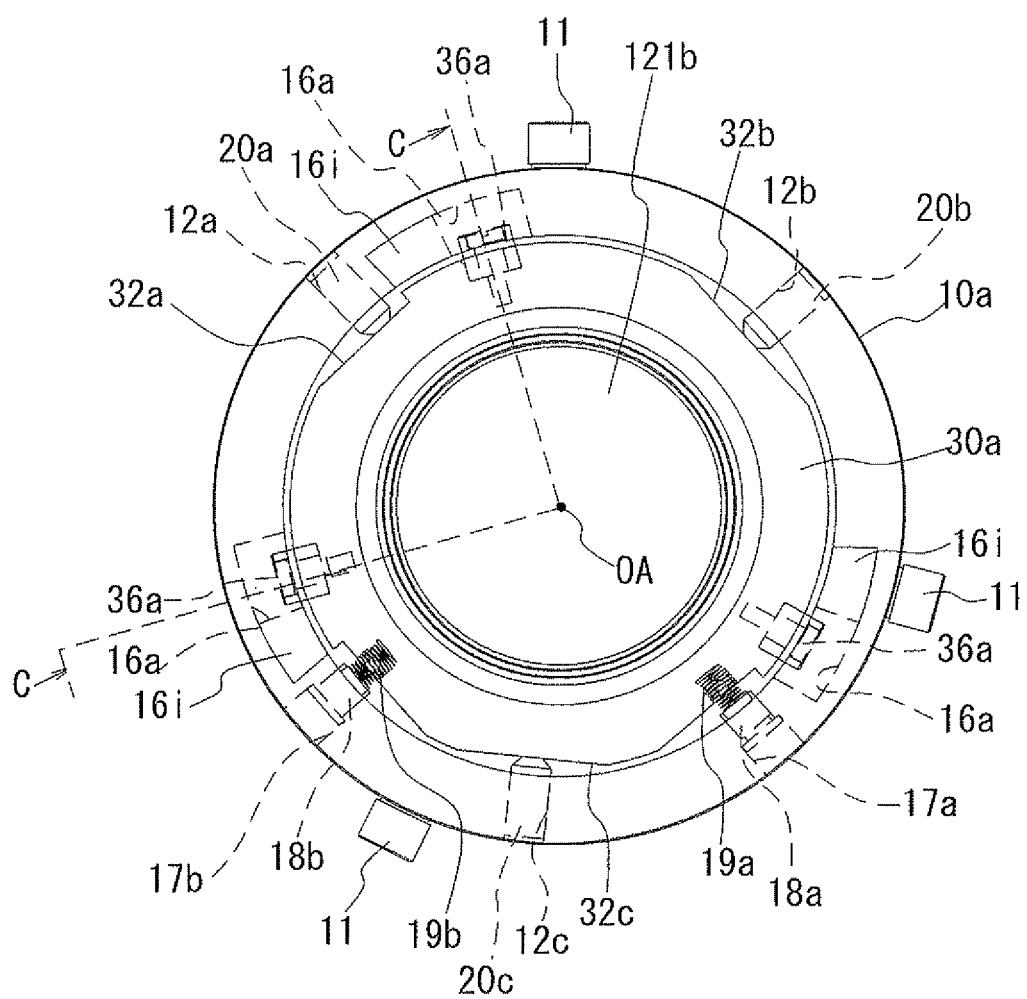
FIG. 8 is a drawing for explaining the coupling member according to the first embodiment.
Figure 9:
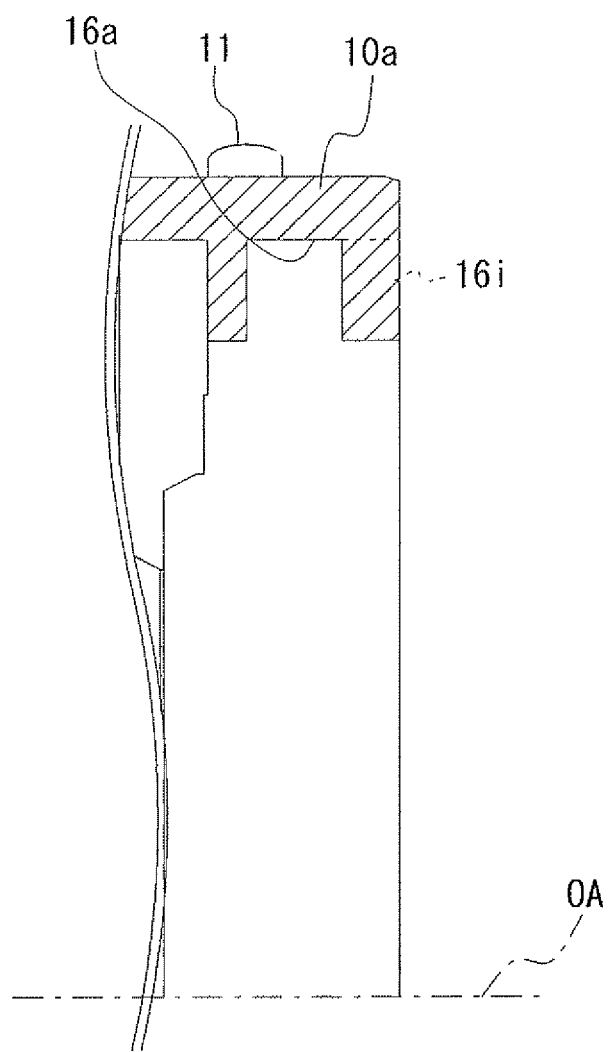
FIG. 9 is a drawing showing only the coupling member according to the first embodiment as a cross sectional drawing along C-C of FIG. 8.

Next, the first variation of the coupling member will be explained. FIG. 7 and FIG. 8 are explanatory drawings of the coupling members 10a and 30a according to the first variation. FIG. 7 corresponds to FIG. 2. FIG. 8 corresponds to FIG. 3. FIG. 9 shows only the coupling member 10a and is a cross sectional drawing of C-C of FIG. 8.

The groove 16a does not pass through the coupling member 10a. The groove 16a is formed at the inner peripheral face side of the coupling member 10a. The groove 16a runs in a planar direction orthogonal to the optical axis OA. The pin 36a is engaged with the coupling member 30a. One end of the pin 36a is fixed to the coupling member 30a side, and the other end is inserted into the groove 16a.

The groove 16a is continuous with the groove 16i. The groove 16i runs along the optical axis OA. The groove 16i does not pass through the coupling member 10a. The groove 16i is formed at the inner peripheral face side of the coupling member 10a. The groove 16a and the groove 16i are orthogonal to each other when viewed from a direction orthogonal to the optical axis OA. The groove 16i is for inserting the pin 36a into the groove 16a. When inserting the coupling member 30a into the coupling member 10a, the pin 36a which is engaged with the coupling member 30a in advance is inserted into the groove 16i, and by rotating the coupling member 30a about the optical axis OA with respect to the coupling member 10a, the pin 36a is inserted into the groove 16a.

While the pin 36a is inserted into the groove 16a, the coupling member 30a is allowed to move only in the direction of the groove 16a with respect to the coupling member 10a. In this way, it is possible to restrict the direction of the movement of the coupling member 30a with respect to the coupling member 10a.

Figure 10:
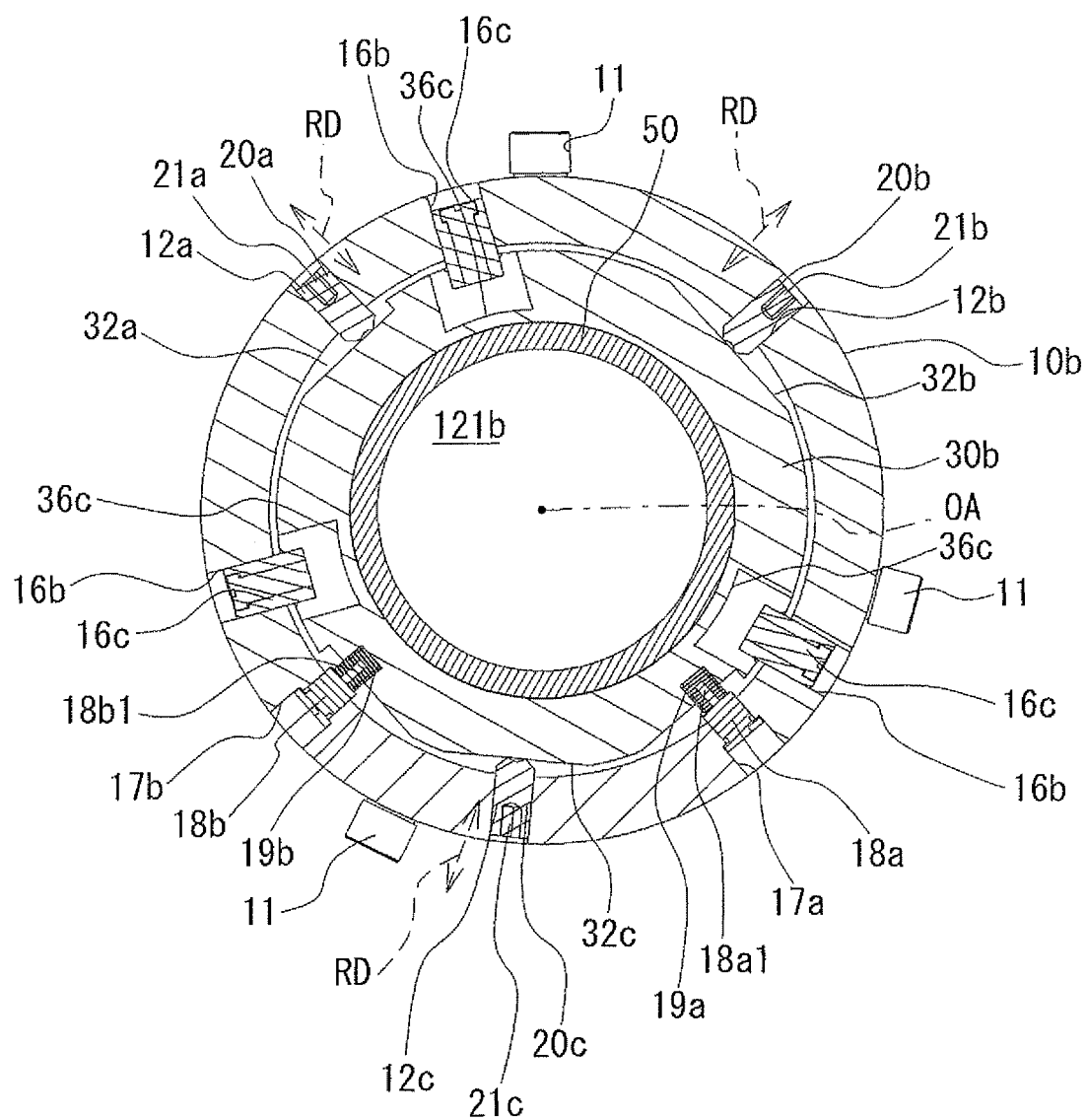
FIG. 10 is a drawing for explaining the coupling member according to the second embodiment.

Next, the second variation of the coupling member will be explained. FIG. 10 is a drawing for explaining the coupling member according to the second variation. FIG. 10 shows a cross section of the coupling members 10b and 30b along an imaginary line orthogonal to the optical axis OA. FIG. 10 corresponds to FIG. 4.

In the coupling member 10b, a plurality of holes 16b are formed, and the holes 16b are fitted with respective pins 16c. Accordingly, the pins 16c are engaged with 10c. The holes 16b pass through the coupling member 10b. At the coupling member 30b, a plurality of grooves 36c are formed at the outer peripheral face side facing the inner peripheral face of the coupling member 10b. The grooves 36c do not pass through the outer peripheral portion of the coupling member 30b. One end of the pin 16c is fixed to the coupling member 10b. The other end of the pin 16c is inserted into the groove 36c. The groove 36c runs along a planar direction orthogonal to the optical axis OA. In other words, the groove 36c extends in the outer peripheral direction of the coupling member 30b. Further, the clearance between the groove 36c and the pin 16c in the direction of the optical axis OA is narrower than the clearance between the groove 36c and the pin 16c in the planar direction orthogonal to the optical axis OA. According to such a constitution, while the pin 16c is inserted into the groove 36c, the coupling member 30c is allowed to move only in the direction of the groove 36c with respect to the coupling member 10b. In this way, it is possible to restrict the direction of the movement of the coupling member 30b with respect to the coupling member 10b.

Above, the embodiments of the present invention were described in detail, but the present invention is not limited to these specific embodiments, and many variations and modifications are possible within the scope of the gist of the invention recited in the claims.

In the above embodiments, the grooves 16, 16a and 36c run along a planar direction orthogonal to the optical axis OA, but may also run along other directions. In this case, the coupling members 30, 30a and 30b are allowed to move only in a direction other than a planar direction orthogonal to OA with respect to the coupling members 10, 10a and 10b.

In the above embodiments, the coupling member 10 is provided with grooves 16, and the pins 36 are fixed to the coupling member 30, but it is not limited to such a constitution. For example, the grooves may be provided at the outer peripheral face of the coupling member 30, and one end may be fixed to the coupling member 10 and the other end may be inserted into the groove.

An optical instrument provided with the optical device may, for example, be a still camera, a video camera, a mobile telephone, a telescope or the like.

The adjusted optical system may be the optical system positioned closest to the subject. The adjusted optical system may be a single lens, or may be a lens unit consisting of a plurality of lenses.

Rubber may be used instead of the springs 19a and 19b. There may be a plurality of the fixing screws 20c. There may be three or more of the adjustment screws 20a and 20b.

What is claimed is:

1. An optical device comprising:
a first holding frame which holds an optical system;
a second holding frame which holds the first holding frame and which has a groove provided on a face opposing the first holding frame;
an elastic member which has elasticity and which is provided between the first holding frame and the second holding frame when seen from a direction crossing an optical axis of the optical system;
a position determining portion which is capable of determining a position of the first holding frame towards the elastic member so as to give rise to an elastic force at the elastic member, and which is provided so as to sandwich, with the elastic member, the first holding frame when seen from a direction crossing the optical axis;
a fixing portion which is capable of fixing the first holding frame towards the position determining portion so that the first holding frame is fixed, and which is provided so as to sandwich, with the position determining portion, the first holding frame when seen from a direction crossing the optical axis; and
a protruding pin which has a first end fixed to the first holding frame, and another end which differs from the first end and which is inserted into the groove.

2. The optical device according to claim 1, wherein:
the groove is provided extending in a planar direction orthogonal to the optical axis.

3. The optical device according to claim 1, wherein:
a clearance between the groove and the protruding pin in the optical axis direction is narrower than the clearance between the groove and the protruding pin in a planar direction orthogonal to the optical axis.

4. The optical device according to claim 1, wherein:
the groove is a penetrating groove formed on the second holding frame.

5. The optical device according to claim 1, wherein:
three or more protruding pins are provided along a planar direction orthogonal to the optical axis.

6. The optical device according to claim 1, wherein:
each of the position determining portion and the fixing portion is a screw which is capable of advancing and withdrawing in a direction orthogonal to the optical axis; and
the protruding pin is provided along a direction orthogonal to the optical axis.

7. The optical device according to claim 1, wherein:
the protruding pin is capable of sliding along the inner peripheral face of the groove.

8. An optical instrument comprising the optical device according to claim 1.

9. An optical device comprising:
a first holding frame which holds an optical system and which has a groove provided at its outer peripheral face;
a second holding frame which holds the first holding frame;
an elastic member which has elasticity and which is provided between the first holding frame and the second holding frame when seen from a direction crossing an optical axis of the optical system;
a position determining portion which is capable of determining a position of the first holding frame towards the elastic member so as to give rise to an elastic force at the elastic member, and which is provided so as to sandwich, with the elastic member, the first holding frame when seen from a direction crossing the optical axis;
a fixing portion which is capable of fixing the first holding frame towards the position determining means so that the first holding frame is fixed, and which is provided so as to sandwich, with the position determining portion, the first holding frame when seen from the direction crossing the optical axis, and
a protruding pin having a first end fixed to the second holding frame, and another end which differs from the first end and which is inserted into the groove.

* * * * *